(12) United States Patent
Märkl

(10) Patent No.: US 9,255,633 B2
(45) Date of Patent: Feb. 9, 2016

(54) DRIVE ARRANGEMENT

(75) Inventor: Johann Märkl, Ingolstadt (DE)

(73) Assignee: AUDI AG, Ingolstadt (DE)

(*) Notice: Subject to any disclaimer, the term of this patent is extended or adjusted under 35 U.S.C. 154(b) by 376 days.

(21) Appl. No.: 13/463,914

(22) Filed: May 4, 2012

(65) Prior Publication Data
US 2013/0123058 A1    May 16, 2013

(30) Foreign Application Priority Data
May 6, 2011 (DE) .......... 10 2011 100 816

(51) Int. Cl.
*B60K 17/16* (2006.01)
*F16H 48/06* (2006.01)
*B60K 7/00* (2006.01)

(52) U.S. Cl.
CPC .............. *F16H 48/06* (2013.01); *B60K 7/0007* (2013.01); *B60K 17/165* (2013.01)

(58) Field of Classification Search
CPC ................................... F16H 37/082
USPC ........................................... 475/150
See application file for complete search history.

(56) References Cited

U.S. PATENT DOCUMENTS

| | | | | |
|---|---|---|---|---|
| 1,093,631 A | * | 4/1914 | Kennedy | 180/349 |
| 2,450,290 A | * | 9/1948 | Maxwell | 310/83 |
| 5,637,048 A | * | 6/1997 | Maeda et al. | 475/150 |
| 5,759,128 A | * | 6/1998 | Mizutani et al. | 475/149 |
| 7,316,627 B2 | * | 1/2008 | Bennett | B60K 17/043 475/149 |
| 2003/0196842 A1 | * | 10/2003 | Hashimoto | B60K 1/00 180/65.1 |
| 2011/0094806 A1 | * | 4/2011 | Mack et al. | 180/65.6 |
| 2012/0083378 A1 | * | 4/2012 | Severinsson et al. | 475/150 |
| 2012/0129644 A1 | * | 5/2012 | Palfai | B60K 1/00 475/150 |
| 2013/0274050 A1 | * | 10/2013 | Kalmbach | F16H 3/44 475/150 |
| 2013/0274053 A1 | * | 10/2013 | Bauerlein | F16H 48/06 475/150 |

FOREIGN PATENT DOCUMENTS

| | | |
|---|---|---|
| CN | 2541230 Y | 3/2003 |
| CN | 101544178 A | 9/2009 |
| DE | 43 34 590 A1 | 4/1993 |
| DE | 199 54 590 A1 | 5/2001 |
| DE | 102004037266 A1 | 2/2002 |
| DE | 10 2009 006 424 A1 | 7/2010 |
| DE | 10 2009 031 869 A1 | 2/2011 |
| EP | 1000829 A1 | 5/2000 |
| JP | 2000035092 A | 2/2000 |
| WO | WO 2010101506 A1 * | 9/2010 |

OTHER PUBLICATIONS

Chinese Search Report with respect to counterpart Chinese patent application 201210138485.1.

* cited by examiner

*Primary Examiner* — Robert Hodge
*Assistant Examiner* — Ryan Dodd
(74) *Attorney, Agent, or Firm* — Henry M. Feiereisen LLC

(57) ABSTRACT

In a drive arrangement for wheels of a motor vehicle which are driven by an electric machine via a differential, an electric machine which has a ring shaped rotor drives a drive element of the differential, whose output shafts output to the wheels of the motor vehicle. The ring shaped rotor of the electric machine outputs to the input element of the differential via a gear mechanism and the differential is integrated in the rotor thereby allowing for a structurally compact construction and enabling favorable transmission ratios.

15 Claims, 2 Drawing Sheets

DRIVE ARRANGEMENT

CROSS-REFERENCES TO RELATED APPLICATIONS

This application claims the priority of German Patent Application, Serial No. 10 2011 100 816.4, filed May 6, 2011, pursuant to 35 U.S.C. 119(a)-(d), the disclosure of which is incorporated herein by reference.

BACKGROUND OF THE INVENTION

The present invention relates to a drive arrangement for wheels of a motor vehicle which are driven by means of an electric machine via a differential.

The following discussion of related art is provided to assist the reader in understanding the advantages of the invention, and is not to be construed as an admission that this related art is prior art to this invention.

In electrically driven motor vehicles or hybrid drives it is know to drive an axle of the motor vehicle by means of an electromotor or an electric machine (which is also operable as a generator during braking) via a customary differential. If the electric machine is to have a high torque or respectively a high driving power the accommodation in the motor vehicle can be problematic.

It would therefore be desirable and advantageous to provide and improved drive arrangement which allows mounting large sized electric motors or electric machines in a constructively favorable way and with higher constructive degrees of freedom.

SUMMARY OF THE INVENTION

According to one aspect of the present invention, a drive arrangement includes a differential having an input element and output elements, wherein the output elements are operably connected to the wheels of the motor vehicle via output shafts; a gear mechanism, and an electric machine having a ring shaped rotor, wherein the ring shaped rotor defines a rotation axis of the electric machine and is connected in driving relationship with the input element of the differential via the gear mechanism, and wherein the ring shaped rotor and the gear mechanism are integrated in the rotor. This results in a particularly compact and with regard to manufacturing favorable construction of the drive arrangement, which in addition is also well adjustable to narrow mounting spaces. The gear mechanism which is interposed there between allows sufficiently high drive torques of the electric machine at moderate constructional efforts.

According to another advantageous feature of the invention, the gear mechanism can be constructed as a planet gear train having a housing-fixed reaction element and another input element in driving relationship with the rotor, wherein the rotor can have an output element drivingly connected to the input element of the differential. Such a planet gear train allows realizing high transmission ratios at a favorable transmission efficiency and at a relatively small installation space. In an advantageous layout of the planet gear train, the other input element of the gear mechanism can be an internal gear which is arranged in a hollow shaft of the rotor, the output element can be a planet gear carrier with planet gears and the reaction element can be a housing-fixed sun gear.

In a particularly advantageous refinement of the invention, the differential and the gear mechanism can be supported coaxial to the rotor of the electric machine via intermediate shafts which are connected to the output elements of the differential and, via two further gear mechanisms, output to output shafts which are supported offset to the rotation axis of the electric machine. The further gear mechanisms enable a still greater layout of the overall transmission ratio of the drive arrangement and in particular have the advantage that the electric machine with integrated differential is offset in particular upwards relative to the rotation axes of the output shafts and thus ensures sufficient ground clearance of the drive arrangement in the motor vehicle.

For easy manufacturing, the two further gear mechanisms can be positioned outside and on both sides of the electric machine and can in particular be formed by pinions on the intermediate shafts and by internally toothed internal gears on the output shafts. Thereby, the gear mechanisms can be produced as pre-assembly units and mounted to the electric machine and the differential via plug-in connections. Instead of the internal gears which mesh with the pinions pure spur gear systems can also be used as gear mechanisms.

According to another advantageous feature of the invention, the gear mechanism which is integrated in the electric machine and acts on the differential can be shiftable into a driveless neutral position or into at least one transmission stage via a shifting device. This allows further degrees of freedom in the transmission layout of the drive arrangement at a structurally and constructively little additional effort, and in addition enables a disengagement of the electric machine in the neutral position of the shifting device, which can be particularly advantageous in a hybrid drive of the motor vehicle for example during operation of the internal combustion engine.

According to another advantageous feature of the invention, the reaction element of the gear mechanism or respectively the planet gear train can be shiftable by the shifting device between three positions, a first position in which the reaction element is housing-fixed, a second position in which the reaction element is freely rotatable, and a third position in which the reaction element is coupled to the input element. Beside the disengagement function, this results in two transmission stages, namely a transmission ratio which increases the torque, and a 1:1 transmission ratio which is advantageous for the higher speed range of the motor vehicle.

For this, in a structurally simple construction, the reaction element or respectively, the sun gear of the planet gear train can carry shifting gears which interact with a control sleeve which is actuatable via an actuator, wherein the control sleeve is further coupleable to a housing-fixed shifting gear system or to a shifting gear system which is formed on the driving element According to another advantageous feature of the invention, the differential can be a bevel gear differential, wherein however, the planet gear carrier of the upstream situated planet gear train forms a unitary structure with the differential case of the differential. Further transmission wise advantageous embodiments of the drive arrangement within this context, are set forth in the further sub claims and in the following description.

Finally, in order to achieve a structurally compact and mounting wise favorable construction of the electric machine, the gear mechanism and the differential with the output shafts and if necessary the intermediate shafts and the further gear mechanisms can be mounted together in a common axle housing.

In the following, two exemplary embodiments of the invention are explained in more detail. The schematic drawing shows in:

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
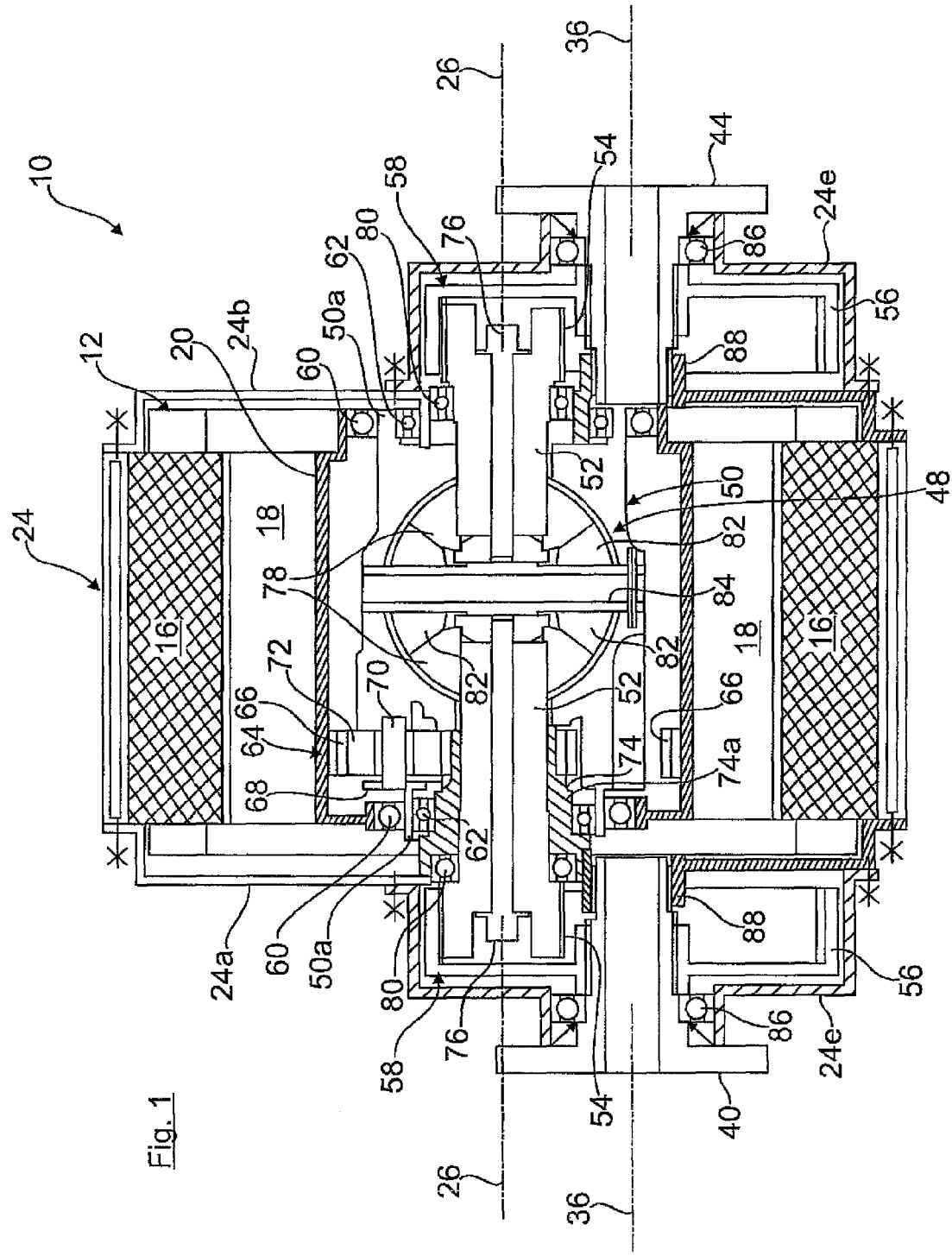
FIG. 1 is a schematic representation of a first drive arrangement with a ring shaped electric machine, a gear mechanism which is integrated in the rotor of the electric machine and a differential which outputs to the wheels of a motor vehicle via further lateral gear mechanisms and output shafts.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a drive arrangement for an electrically driven axle (for example a front axle or a rear axle) of a motor vehicle which is designated 10, and which is formed inter alia by an electric machine 12, a planet gear train 64 as integrated gear mechanism and a bevel gear differential 48 which is also integrated in the electric machine 12.

The driving electric machine 12 which during braking or respectively, during coasting of the motor vehicle can also be shifted to function as a generator, has a ring shaped stator 16 and a ring shaped rotor 18 which is arranged on a hollow drive shaft 20. The hollow drive shaft 20 is supported in housing walls 24a, 24b of the housing 24 via rolling bearings for rotation about a first rotation axis 26 which thus defines the "center" of the electric machine 12.

The differential side gears 78 of the differential 48 output to intermediate shafts 52 which are rotatably supported in the housing walls 24a, 24b via rolling bearings and which carry pinions 54 on both sides which in connection with pot-shaped internal gears 56 form two laterally arranged gear mechanisms 58.

The internal gears 56 are drivingly and fixedly connected to the flange shafts 40, 44 which with a rotation axis 36 are supported in outer housing covers 24e axially parallel and with an offset to the rotation axis 26 (here for example downward).

The bevel gear differential 48 is integrated coaxial to the rotor 18 in the hollow drive shaft 20 of the latter, wherein the hollow drive shaft 20 is rotatably supported via rolling bearings 60 on bearing necks 50a of the differential case 50 and the bearing necks are rotatably supported via further rolling bearings 62 on bearing collars of the front side housing walls 24a, 24b. The housing wall 24a in the shown exemplary case transitions into a hub section 74a, which is further explained below.

The rotor or respectively, its hollow drive shaft 20 drives the input element or respectively, the differential case 50 of the differential 48 via the gear mechanism 64.

The gear mechanism or respectively, the planet gear train which is upstream to the differential 48 with regard to the force flux, has an input element constructed as an internally toothed internal gear 66 which is fixedly connected to the hollow drive shaft 20, a planet gear carrier which is directly integrated in the differential case 50 and has planet gears 72 (only one planet gear 72 is visible) which are supported on axes 70, and finally a sun gear 74 which is fixedly connected to the housing wall 24a.

The hub section 74a of the sun gear which is fixed to the housing forms at the same time the bearing collar for the mentioned rolling bearing 62 and the sliding bearing of the one, here left, intermediate shaft 52.

The intermediate shafts 52 are here fixedly bolted to the differential side gears 78 of the differential 48 by means of clamping bolts 76 in a manner known per se and rotatably supported in the housing walls 24a, 24b or respectively, the hub section 74a of the housing-fixed sun gear. The differential side gears 78 mesh with the planet bevel gears 78 in a manner known per se which planet bevel gears are rotatably supported on a catch 84 which is fixed to the differential case 50.

Further, the intermediate shafts carry the pinions 54, which together with the internal gears 56 on the flange shafts 40, 44 form the gear mechanisms 58 which are situated on both sides.

The flange shafts 40, 44 are rotatably supported in bearing collars of the housing walls 24a, 24b and in the housing covers via rolling bearings 86, 88, wherein the rotation axis 36 is correspondingly offset downward.

Through the gear mechanism 64 which is situated upstream of the differential 48 with regard to the force flux and the two gear mechanisms 58 which are situated downstream of the differential 48 with regard to the force flux an overall transmission ratio of for example 3 between the rotor 18 of the driving electric machine 12 and the outputting flanges shafts 40, 44 can be designed in a structurally and constructively favorable layout.

Figure 2:
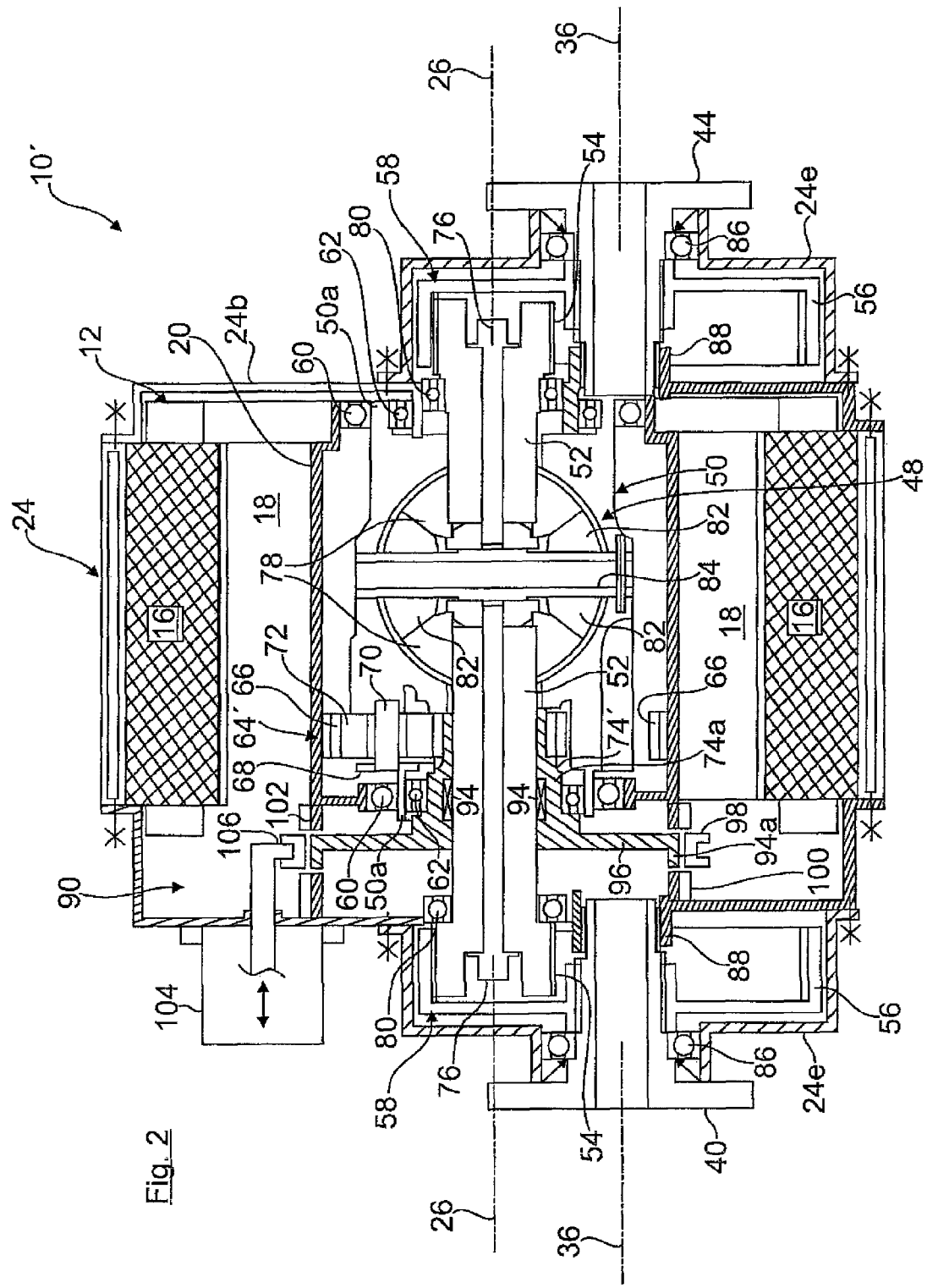
FIG. 2 is a drive arrangement analogous to FIG. 1 in which however, the gear mechanism is configured shiftable via a shifting device.

A further transmission layout is achieved with the drive arrangement 10' according to FIG. 2, in which the first gear mechanism 64' is configured shiftable. The drive arrangement 10' is only described insofar it significantly differs from FIG. 1. Functionally same parts are provided with same reference signs.

In distinction to FIG. 1 the sun gear 74' of the planet gear trains which is shiftable via a shifting device 90 is not housing-fixed but rotatably supported on the left intermediate shaft 52 via a rolling bearing 94.

Further, the sun gear 74' carries a shifting gear 96 with an outer shifting tooth system 49a on which a control sleeve 98 with a corresponding internal tooth system is arranged.

The control sleeve 98 interacts with a housing-fixed shifting tooth system 100 and with a shifting gear 102 on hollow driveshaft 20 which carries the internal gear of the planet gear train 64'.

The control sleeve 98 is shiftable from the drawn neutral position—in which the sun gear 74' is freely rotatable—towards the left onto the housing-fixed shifting tooth system 100 or towards the right onto the shifting tooth system 102 of the hollow drive shaft 20.

In the neutral position of the shifting device 90, the sun gear 64' is freely rotatable and with this the electric machine 12 is disengaged from the differential 64' or respectively from the entire drive.

When the sun gear 74' is shifted to be housing-fixed according to FIG. 1, a defined first transmission stage is established.

In the right shifting position of the shifting device 90, the sun gear 74' is coupled to the hollow drive shaft or respectively, the internal gear 66, whereby the planet gear train 64' is blocked in itself or respectively, a second transmission stage 1:1 is established. The remaining function of the drive arrangement 10' corresponds to the drive arrangement 10 of FIG. 1.

The differential 14 can also be configured as a customary planet gear train.

For achieving a different transmission ratio, the gear mechanism 64 can also be configured so that the rotor 18 or respectively its hollow drive shaft 20 outputs to the then rotatably supported sun gear 74, while the internally toothed internal gear 66 is supported housing-fixed.

Instead of the gear mechanisms 58 with a internal gear 56, these can also be configured as spur gear drives, wherein then the pinion 54 would mesh with a further externally toothed spur gear on the flange shafts 40, 44.

If the offset of the rotation axes 26, 36 of the drive arrangement 10, 10' is not required, the lateral gear mechanisms 58 and the intermediate shafts' 52 may be omitted. In this case, the differential 48 directly outputs to the output shafts 40, 44 which are drivingly connected to the axle bevel gears 78

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A drive arrangement for wheels of a motor vehicle, comprising:
    a differential having an input element output elements and a differential case, said output elements being respectively operably connected to the wheels of the motor vehicle via output shafts;
    a gear mechanism; and
    an electric machine having a ring shaped rotor, said ring shaped rotor defining a rotation axis of the electric machine and being connected in driving relationship with the input element of the differential via the gear mechanism, wherein the gear mechanism and the differential are substantially entirely arranged within a space entirely axially surrounded by the rotor, wherein the gear mechanism is constructed as a planet gear train, said planet gear train having a housing-fixed reaction element, another input element in driving relationship with the rotor, and an output element drivingly connected to the input element of the differential.

2. The drive arrangement of claim 1, wherein the another input element of the planet gear train is constructed as an internal gear which is arranged in a hollow shaft of the rotor, wherein the another output element is constructed as a planet carrier having planet gears, and wherein the reaction element is constructed as a sun gear.

3. The drive arrangement of claim 1, further comprising two further gear mechanisms and intermediate shafts connected to the output elements of the differential, wherein the differential and the first gear mechanism are supported in coaxial relationship to the rotor and are in driving relationship with the output shafts, with the output shafts being supported at an offset to the rotation axis of the electric machine.

4. The drive arrangement of claim 3, wherein the two further gear mechanisms are respectively positioned outside of the electric machine and on one of two sides of the electric machine, said two sides opposing each other along the rotation axis.

5. The drive arrangement of claim 3, wherein the two second gear mechanisms are formed by pinions mounted on the intermediate shafts and by inner gears mounted on the output shafts.

6. The drive arrangement of claim 1, wherein the reaction element of the gear mechanism or respectively the planet gear train is shiftable by the shifting device between three positions a first position in which the reaction element is fixed to a housing of the electric machine, a second position in which the reaction element is freely rotatable, and a third position in which the reaction element is coupled to the input element.

7. The drive arrangement of claim 1, wherein the reaction element is constructed as a sun gear which carries a shifting gear system said shifting gear system interacting with a control sleeve via an actuator said control sleeve being coupleable to a shifting gear fixed to a housing of the electric machine or to another shifting gear which is formed on the other input element.

8. The drive arrangement of claim 2, wherein the differential is constructed as a bevel gear differential and wherein the planet carrier forms a unitary structure with a differential case of the differential.

9. The drive arrangement of claim 2, further comprising a second gear mechanism, wherein the sun gear is constructed to operate as a bearing hub for one of the intermediate shafts and carries a rolling bearing of the one of the intermediate shafts in a region of a pinion of the second gear mechanism.

10. The drive arrangement of claim 1, further comprising an axle housing having housing walls provided with bearing collars, wherein both sides of the rotor of the electric machine is rotatably supported on both of its sides on bearing necks of the differential case via rolling bearings and wherein the bearing necks are rotatably supported on the bearing collars of the housing walls via rolling bearings.

11. The drive arrangement of claim 10, wherein the bearing collar is directly formed on the sun gear.

12. The drive arrangement of claim 3, wherein the two further gear mechanisms are respectively arranged between the intermediate shafts and the output shafts and are formed by spur gears which mesh with one another.

13. The drive arrangement of claim 1, further comprising an axle housing to accommodate the electric machine, the gear mechanism the differential and the output shafts.

14. The drive arrangement of claim 3, further comprising an axle housing to accommodate the electric machine, the gear mechanism, the differential, the output shafts, the intermediate shafts and the two further gear mechanisms.

15. The drive arrangement of claim 2, wherein the sun gear is selectively connected to the rotor of the electric machine in a selectively fixed rotative engagement, wherein the inner gear is arranged fixed to the housing, and wherein the planet carrier is drivingly coupled to a differential case of the differential.

* * * * *